(12) United States Patent
Akashima

(10) Patent No.: US 8,027,057 B2
(45) Date of Patent: Sep. 27, 2011

(54) PRINT CONTROL DEVICE AND RECORDING MEDIUM CONTAINING PRINTER DRIVER FOR ADJUSTING PRINT AREA BASED ON CONVERTED FILE FORMAT

(75) Inventor: Tomoyuki Akashima, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 633 days.

(21) Appl. No.: 12/184,768

(22) Filed: Aug. 1, 2008

(65) Prior Publication Data
US 2009/0033965 A1 Feb. 5, 2009

(30) Foreign Application Priority Data
Aug. 3, 2007 (JP) ................. 2007-202621

(51) Int. Cl.
H04N 1/393 (2006.01)
G06K 15/02 (2006.01)
G06T 3/40 (2006.01)

(52) U.S. Cl. ......... 358/1.2; 358/1.9; 358/1.18; 715/239; 715/276

(58) Field of Classification Search .................. 358/1.2, 358/1.9, 1.18, 528, 451; 715/238, 239, 274, 715/276
See application file for complete search history.

(56) References Cited

U.S. PATENT DOCUMENTS
5,548,406 A * 8/1996 Aihara .......................... 358/296
2006/0221361 A1 10/2006 Takagi
2008/0316514 A1* 12/2008 Arakawa ....................... 358/1.9

FOREIGN PATENT DOCUMENTS
JP 11-305982 11/1999
JP 2003108331 A * 4/2003
JP 2005-043981 2/2005
JP 2006-285870 10/2006

* cited by examiner

Primary Examiner — Scott A Rogers
(74) Attorney, Agent, or Firm — Banner & Witcoff, Ltd.

(57) ABSTRACT

A print control device is capable of processing print job data having a first file format and print job data having a second file format which is different from the first file format. The print control device includes a judging unit configured to judge whether the print data has the first file format or second file format, a converting unit configured to convert the print data having the first file format to the print data having the second file format, an adjusting unit configured to apply a print area adjustment to the print job data converted by the converting unit only when the judging unit judges that the print job data has the first file format, and a data processing unit configured to apply a data processing to the print job data having the second file format.

15 Claims, 11 Drawing Sheets

```
<Filters>
  <Watermark>
    <DLL name>Watermark.DLL</DLL name>
  </Watermark>
  <Scaling>
    <DLL name>SCALING.dll</DLL name>
  </Scaling>
  <Layout>
    <DLL name>Layout.DLL</DLL name>
  </Layout>
  <Mirror>
    <DLL name>Mirror.DLL</DLL name>
  </Mirror>
  <RIP>
    <DLL name>RIP.DLL</DLL name>
  </RIP>
</Filters>
```

```
<Filters>
 <Watermark>
   <DLL name>Watermark.DLL</DLL name>
 </Watermark>
 <Layout>
   <DLL name>Layout.DLL</DLL name>
 </Layout>
 <Mirror>
   <DLL name>Mirror.DLL</DLL name>
 </Mirror>
 <RIP>
   <DLL name>RIP.DLL</DLL name>
 </RIP>
</Filters>
```

PRINT CONTROL DEVICE AND RECORDING MEDIUM CONTAINING PRINTER DRIVER FOR ADJUSTING PRINT AREA BASED ON CONVERTED FILE FORMAT

INCORPORATION BY REFERENCE

This application claims priority from Japanese Patent Application No. 2007-202621, filed on Aug. 3, 2007, the entire subject matter of which is incorporated herein by reference thereto.

BACKGROUND

1. Technical Field

The present invention relates to a print control device and a recording medium containing a printer driver, which is a program for controlling a printer. Specifically, the invention relates to a print control device and a printer driver configured to process print job data with use of functional filters.

2. Related Art

Conventionally, there has been known a print control device which is configured to control an image forming device. Such a print control device is typically configured to generate an EMF (Enhanced Meta File), which is a vector type intermediate file, based on document data created by an application (such an application is generally referred to as an EMF application). The print control device making use of the EMF file is configured to convert the EMF file to PDL (Page Description Language) data suitable to a printer and then transmits the converted data to the printer.

Recently, print control devices capable of using a file described with a markup language such as an XML (Extensible Markup Language) in addition to the EMF file have been developed. In the following description, the intermediate file described with the markup language will be referred to as an XML file, and applications capable of generating XML files will be referred to as XML applications.

The printer driver for the XML file, which is installed in the print control device has a function of converting the EMF file to the XML file in order to maintain compatibility with the EMF applications, which are mainstream nowadays. In other words, generally, the printer driver for the XML is provided with the function of converting the EMF file to the XML file so that the compatibility with the EMF applications is maintained.

An example of the print control device which is configured to process both the EMF files and XML files is disclosed in Japanese Patent Provisional Publication No. 2006-285870 (hereinafter, referred to '870 publication).

SUMMARY OF THE INVENTION

However, the print control device disclosed in '870 publication has problems described below. The printer driver for the XML file is originally developed to provide a printing environment for XML applications. Therefore, due to a difference of design philosophy, it is difficult to convert the XML files to the EMF files which are fully compatible to one created by the EMF applications.

For example, an EMF file created by an Win32 application which runs on Microsoft Windows® and an XML file created by a WPF application which also runs on Microsoft Windows® have different start points of imaging forming areas.

As shown in FIG. 13, the WPF application defines the starting point as an upper left point of a physical area of a sheet S, while the Win32 application defines the starting point as an upper left point of an area X (indicated by dotted lines), which is a printable area of the device. Therefore, when the XML file is generated based on the EMF file output by the Win32 application, the printing area is insufficient and part of the print data D is not printed (i.e., a portion at the lower right area DL in FIG. 13).

In the above exemplary case, by applying a size reduction process to the print data D, the image represented by the print data D can be printed within the printable area of the sheet S. Therefore, by providing an adjustment function for adjusting the print area as an option of a scaling function, deterioration of image quality due to the difference of the starting point of the printing areas can be avoided.

According to the above method, however, it is necessary to display a dialogue for a user to select the adjusting functions prior to execution of the printing. That is, the user is required to recognize the type of the application (i.e., whether the application is the EMF application or the WPF application), which generates a print job data, and select an appropriate option in the dialogue. It is not practical to require general users to recognize such a technical matter, and requiring the selection process is inconvenient for the user.

Since the EMF applications such as the Win32 application are mainstream, it may be convenient to the user that a setting for the EMF application is used as the default setting. However, when the user uses the XML application, the user may keep using the default setting. In such a case, the printing quality is deteriorated since the adjustment of the printing area may not be done correctly.

In consideration of the above problem, the present invention is advantageous in that an improved printing control device is provided, which solves the above problem. That is, according to the invention, there is provided a print control device capable of switching the functions automatically depending on the application used for creating the print data so that deterioration of the printed image can be suppressed.

In order to solve the above problem, according to the present invention, there is provided print control device capable of processing print job data having a first file format and print job data having a second file format which is different from the first file format. The print control device includes a judging unit configured to judge whether the print data has the first file format or second file format, a converting unit configured to convert the print data having the first file format to the print data having the second file format if the judging unit judges that the print job data has the first file format, an adjusting unit configured to apply a print area adjustment to the print job data converted by the converting unit only when the judging unit judges that the print job data has the first file format, and a data processing unit configured to apply a data processing to the print job data having the second file format.

According the above configuration, the print control device is capable of converting the print job data having the first file format, and further the necessary data processing can be automatically applied to the converted data.

The above configuration may be provided in the form of a program, which may be stored on a recording medium such as a CD-R, DVD, memory cards and the like.

BRIEF DESCRIPTION OF THE ACCOMPANYING DRAWINGS

DETAILED DESCRIPTION OF THE EMBODIMENTS

Hereinafter, referring to the accompanying drawings, a print control device according to embodiments of the invention are applied will be described. Specifically, a personal computer (PC) in which a printer driver is installed will be described as an example of the print control device.

Configuration of Print System

Figure 1:
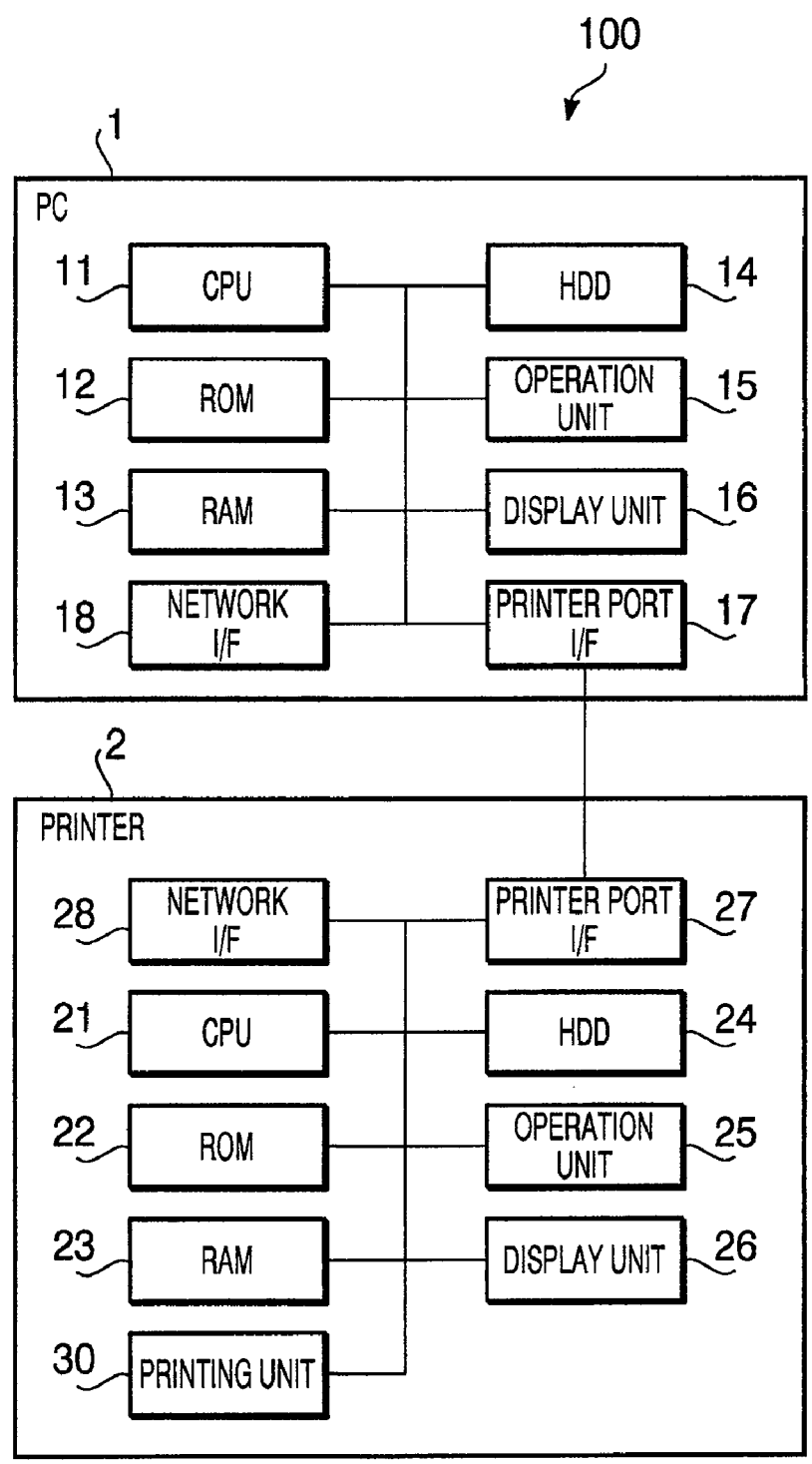
FIG. 1 is a block diagram showing a configuration of a print system according to an embodiments of the invention.

FIG. 1 is a block diagram of a print system 100, including a printer 2 and a PC 1, which are connected with each other via a USB (Universal Serial Bus) cable. Although only one printer 2 and one PC 1 are provided in the print system 100 shown in FIG. 1 for brevity, the number of the printer and the number of the PC are not necessarily be limited to one, respectively. That is, the printer system 100 according to the invention may include a plurality of printers and/or a plurality of PCs. Further, although the connection between the PC 1 and the printer 2 is made by the USB cable in FIG. 1, any other suitable method such as a serial communication cable, a parallel communication cable, a wired LAN (Local Area Network) cable or a wireless communication (e.g., a wireless LAN) may be used.

As shown in FIG. 1, the PC 1 is provided with a CPU (Central Processing Unit) 11 for executing various processes, a ROM (Read Only Memory) 12 storing programs such as a BIOS executed by the CPU 11, a RAM (Random Access Memory) 13 which is used as a storage temporarily storing data when the CPU 11 executes various processes and an HDD (Hard Disk Drive) 14 storing various programs to be executed by the CPU 11 and data.

The PC 1 is further provided with an operating unit 15 including a keyboard and mouse, a display unit 16 including an LCD (Liquid Crystal Display), a printer port interface 17 for exchanging signals with the printer 2 (the USB interface and the like in the embodiments) and a network interface 18 for exchanging signals via the LAN, the Internet and the like.

In the HDD 14, an OS (Operating System), applications capable of editing image data (e.g., text creating software, drawing software, spreadsheet software, photo data editing software, etc.), and a printer driver for transmitting print data which is described with PDL (Page Description Language) to the printer 2 are stored (installed).

The printer 2 includes a CPU 21, a ROM 22 storing programs such as a boot process of the printer 2, a RAM 23 which is used as a temporary memory for storing data when the CPU 21 executes various processes and an HDD 24 for storing various programs and data.

The printer 2 further includes an operation unit 25 which is arranged on an outer surface of a housing of the printer 2 and provided with a plurality of buttons, and a display unit 26 which is also arranged on an outer surface of the housing of the printer 2 and provided with an LCD panel. The printer 2 further includes a printer port interface 27 (e.g., a USB interface) for exchanging signals with the PC 1, a network interface 28 for exchanging signals through a network such as a LAN and the Internet.

Further, the printer 2 has a printing unit 30 for forming images on recording sheets such as paper or OHP sheets. The printing unit 30 may be configured to form images in accordance with an electrophotographic imaging method, inkjet image forming method or any other well-known image forming method. The printing unit 30 may be configured to form color images or only monochrome images.

According to the print system 100, which includes the printer 2 and the PC 1 as described above, it is possible to create/edit text, table or image data such as photo data using applications installed in the PC 1. Such data generated/edited in the PC 1 is transmitted to the printer 2 in accordance with the user's instruction and images represented by the transmitted data will be printed by the printer 2.

Part of the applications installed in the PC 1 has a printing function, of which the print job data such as text data or image data is transmitted to the printer driver. The printer driver creates print data, which is necessary to print the text or the image with the printer 2, in response to the print job data transmitted from the applications.

The print data created by the printer driver is transmitted to the printer 2 via the printer port interface 17. The printer 2 activates the print unit 30 in response to reception of the print data. Then, the printer 2 forms desired images on a recording sheet in accordance with the print data.

Incidentally, in the PC 1, various applications are installed. The applications are generally categorized into two types. One is the EMF application configured to generate EMF files when printing is executed. An example of such an application is a Win 32 application which runs on Microsoft Windows®. The other is the XML application configured to generate XML files when printing is executed. An example of the XML application is a WPF application which also runs on Microsoft Windows®. Generally, in the PC 1, both the EMF applications and the XML applications are (have been) installed, and the printer driver is capable of handling data transmitted from both the EMF application and the XML application.

First Embodiment

Configuration of Printer Driver

Next, a printer driver 4 installed in the PC 1 will be described. The printer driver 4 for the printer 2 has a plurality of software modules (e.g., DLL) respectively executing various filter processes as "functional filters." The functional filters can be added or deleted to add or delete functions by executing version up programs and/or add-in programs.

Figure 2:
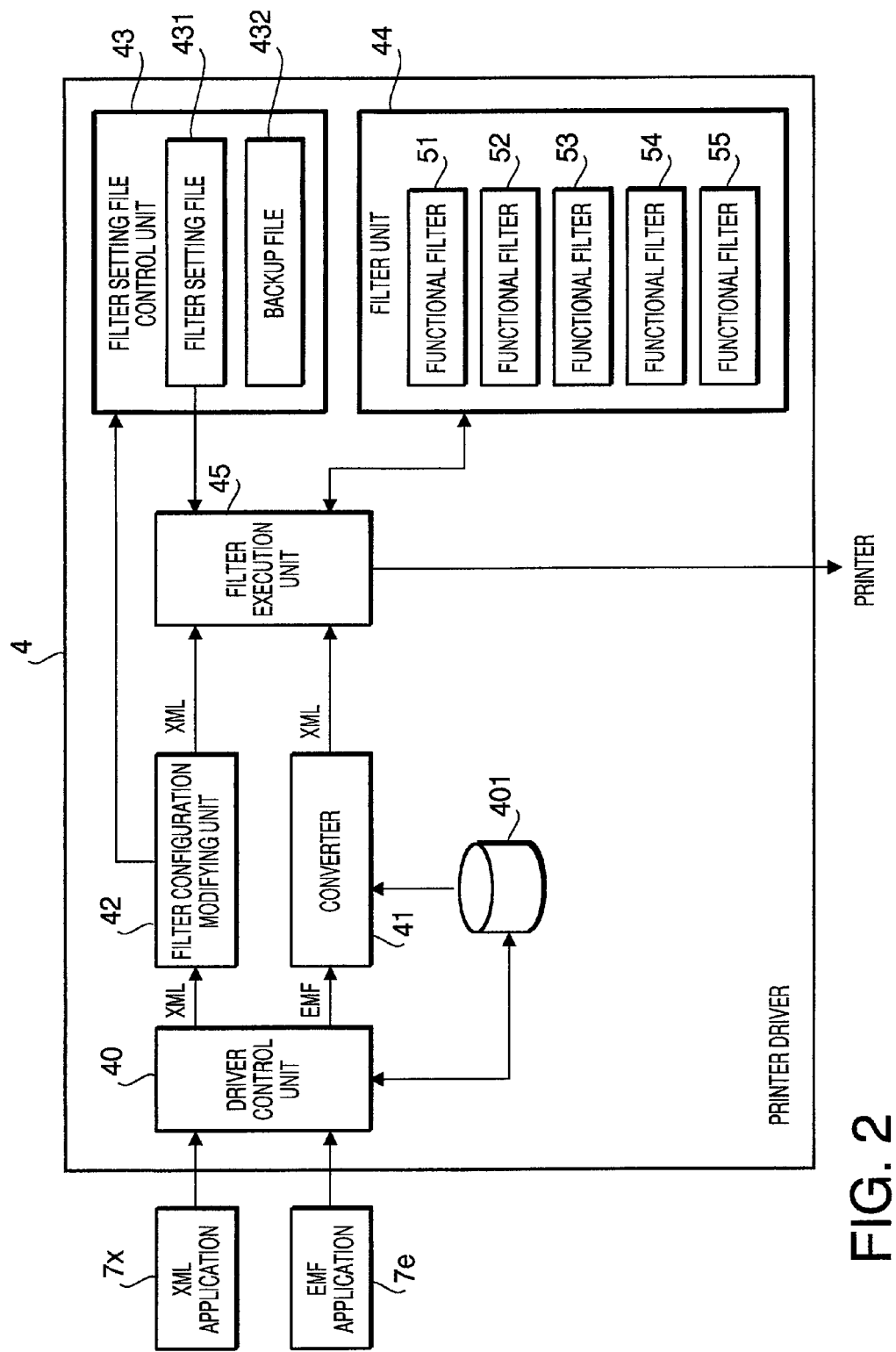
FIG. 2 is a block diagram showing a functional configuration of a printer driver according to a first embodiment of the invention.

FIG. 2 is a block diagram of the printer driver 4 according to the first embodiment. The printer driver 4 includes, as shown in FIG. 2, a driver control unit 40, a converter unit 41, a filter configuration modifying unit 42, a filter setting file control unit 43, a filter unit 44 and a filter executing unit 45.s The printer driver 4 receives requests from the EMF application 7e and XML application 7x, and transmits the print data to the printer 2. From the view point of the EMF application 7e and XML application 7x, an API (Application Program Interface) with which the EMF application 7e accesses the printer driver 4 via the OS and the API with which the XML application 7x accesses the printer driver 4 via the OS are common, and each of the EMF application 7e and XML application 7x calls a predetermined function depending on necessity.

The driver control unit 40 has a function of acquiring requests from the applications 7e and 7x and returning information depending on necessity. Specifically, according to the embodiments, the driver control unit 40 acquires print job data from each of the applications 7e and 7x. It should be noted that, in practice, the print job data output from each of the applications 7e and 7x is accumulated in a spooler, and then transferred to the printer driver 4 in order. In the description of the embodiments, the spooler is omitted for brevity.

The driver control unit 40 further has a function of judging whether the print job data is generated by the EMF application 7e or the XML application 7x. Specifically, the print system 100 is configured such that an API, which is always called when each of the EFM application 7e and the XML application 7x requests printing, is prepared. The API is defined such that, if the print job data is generated by the XML application 7x, a predetermined value (e.g., −1) is delivered to the driver control unit 40. The driver control unit 40 stores the predetermined value (argument) in a judge result file 401. Thus, by accessing the judge result file 401 and referring to the argument, the driver control unit 40 can determine whether the print job data is generated by the EMF application 7e or the XML application 7x.

The converter 41 has a function of converting an EMF file into an XML file. When the conversion is executed, file process settings stored in the EMF file are maintained in the XML file. Further, the converter 41 is configured to automatically add a print area adjustment process, which is an optional function of a scaling function, as one process of filter process when the EMF file is converted to the XML file.

A filter configuration modifying unit 42 has a function of analyzing contents of an XML file and transmitting the analysis result to a filter setting file control unit 43. In regard with the print job data generated by the XML application, it is unnecessary to adjust the printing area. Therefore, if an instruction of a reduction or enlargement is not included in the XML file, the filter configuration modifying unit 42 instructs the filter setting file control unit 43 to restrict readout of the functional filter 52 for scaling.

The filter setting file control unit 43 has a function of storing a structure information of the functional filters provided to the printer driver 4. Specifically, the filter setting file control unit 43 manages a filter setting file 431 and a filter setting backup 432.

Figures 3, 4:
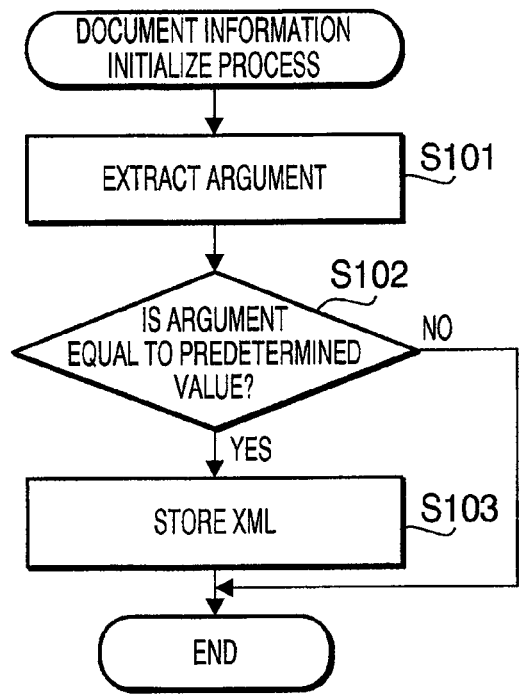
FIG. 3 shows an example of content of a filter setting file containing filter information.
FIG. 4 is a flowchart illustrating a document information initializing process according to the first embodiment.

FIG. 3 shows an example of the filter setting file 431 managed by the filter setting file control unit 43. In the filter setting file 431, available functional filters are listed as an XML file. Specifically, in the filter setting file 431, a type of filter and a reference to the filter module are indicated for each functional filter. In the example shown in FIG. 3, the functional filters of "watermark," "scaling," "layout," "mirror" and "RIP" are listed in association with the names of the filter modules executing the filter functions, respectively. Further, the order of the functional filters in the filter setting file 431 represents the order of execution. That is, according to the configuration of the functional filters shown in FIG. 3, the printer driver 4 executes the filters of "watermark," "scaling," "layout," "mirror" and "RIP" in this order. It should be appreciated that the format of the configuration information of the functional filters need not be limited to the XML file, and any other formats such as an HTML file format or a CSV file format may be used.

A backup file 432 is a file for storing an initial state of the filter setting file 431. In the embodiment, the backup file 432 also includes a list of available functional filters as an XML file. According to the embodiment, FIG. 3 shows the initial state of the filter setting file 431 and the backup file 432 stores the contents shown in FIG. 3 as the initial state of the filter setting file 431 as the XML file.

A filter unit 44 includes a group of libraries of functional filters 51-55 the printer driver 4 contains. The functional filters 51-55 are provided as DLLs and each of the DLLs is retrieved and stored in the memory when executed.

According to the embodiment, the functional filter 51 is a "watermark filter" which adds a watermark (see-through letters), the functional filter 52 is a "scaling filter" which reduces/magnifies an image at a predetermined reduction/magnification ratio, the functional filter 53 is a "layout filter" which enables 2-in-1 printing or poster printing, the functional filter 54 is a "mirror filter" which flips an image horizontally or vertically, and the functional filter 55 is an "RIP filter" which develops data of page descriptive language into bit map data. In particular, according to the first embodiment, the functional filter 52 (i.e., the scaling filter) also functions to adjust the print area.

A filter execution unit 45 has a function of applying a filter process to the document data in accordance with the print job data. The print job data includes information regarding the filter process (e.g., whether a watermark is to be added, and designation of letters and fonts to be used if the watermark is added). When the filter process is executed, the functional filters 51-55 are retrieved one by one in accordance with the filter setting file 431, and the filter process designated by the print job data is executed. The print data to which the filter process has been applied is developed to bitmap data via the RIP filter and transmitted to the printer 2.

Document Information Initialization Process

A print process which is executed when the printer driver 4 acquires a print job will be described. The printer driver 4 executes, a document information initializing process before the filter process in order to initialize the document information of the print job data. The document information initializing process is executed as the applications 7e and 7x read a predetermined function.

FIG. 4 is a flowchart illustrating the document information initialization process. In S101, the process extracts a predetermined one of arguments transmitted from the applications to the printer driver 4. For example, if the application is a Win32 application or WPF application, "DrvDocumentEvent function" (see formula 1 below) is called when a printing is started by the application. The WPF applications (XML applications) call the DrvDocumnetEvent functions with setting the argument hdc to "−1", while the Win32 applications (WMF applications) call the DrvDocumnetEvent functions with setting the argument hdc to a value other than "−1". Therefore, by checking the value of the hdc, the type of the application can be judged.

```
INT DrvDocumentEvent(
    HANDLE  hPrinter,
    HDC     hdc,
    int     iEsc,
    ULONG   cbIn,
    PULONG  pbIn,
    ULONG   cbOut,
    PULONG  pbOut )        .....(1)
```

In S102, the process judges whether the extracted argument (i.e., hdc) has the predetermined value. If the argument has the predetermined value (S102: YES), the process stores in the judge result file 401 that the application is the XML application (S103), and the document information initializing process is finished. If the extracted argument does not have the predetermined value (S102: NO), the process skips step S103 and finishes the process shown in FIG. 4.

Print Process of 1st Embodiment

Figure 5:
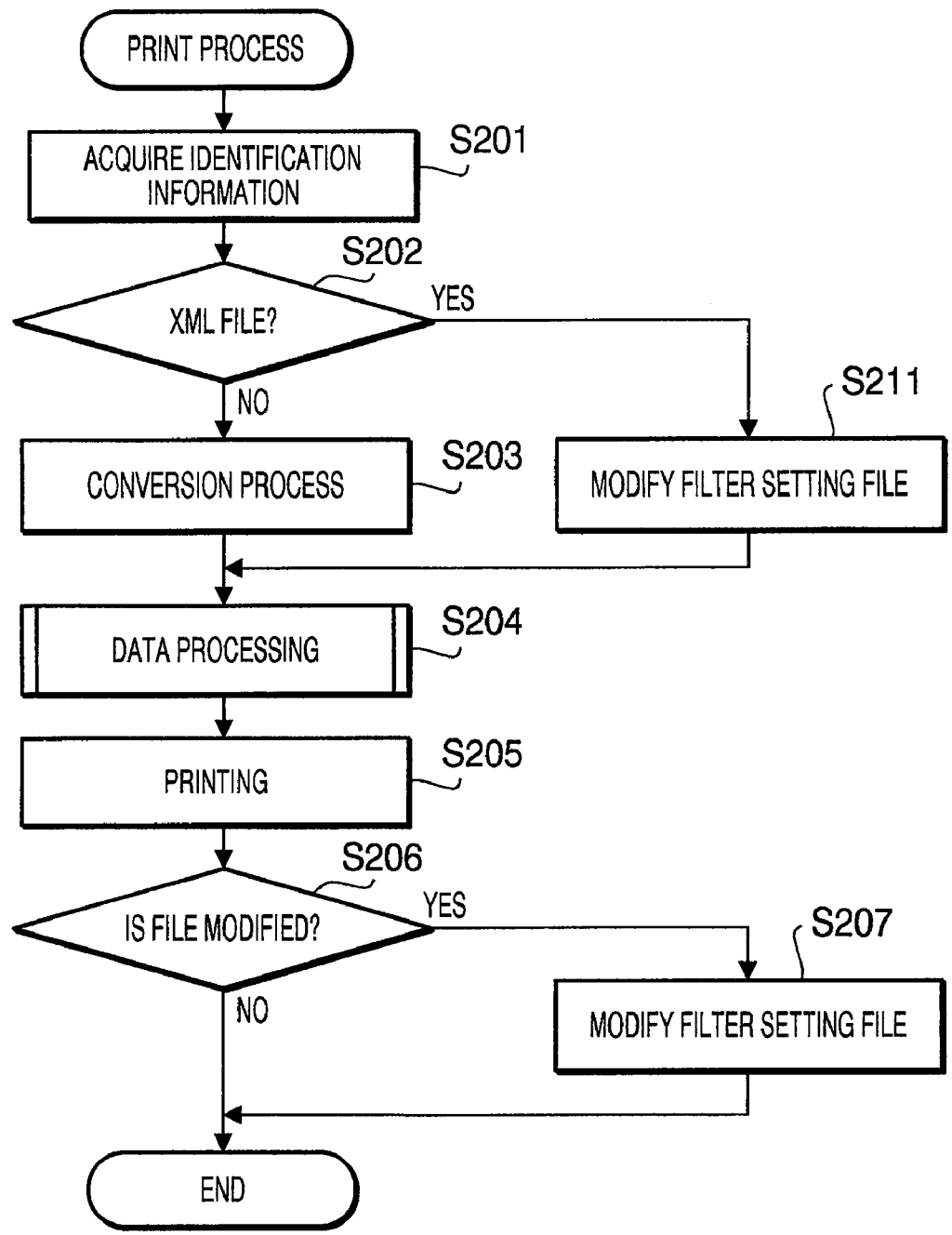
FIG. 5 is a flowchart illustrating a printing process according to the first embodiment.

Next, a print process in which the printer driver 4 transmits print data to the printer 2 will be described. FIG. 5 is a flowchart illustrating the print process of according to the first embodiment. The printer driver 4 is configured to judge the type of a file (i.e., the type of the application) and automatically adjusts the print area if the file is not the XML file.

In S201, the process acquires the information indicative of the type of the application stored in the judge result file 401 during execution of the document information initialization process. Then, the process judges whether the print job comes from the XML application (S202).

If the print job is not generated by the XML application (S202: NO), the process converts the received file into the XML file using the converter unit 41 (S203). When the conversion is executed, the print area adjustment setting, which is an option of the function filter 52 (for scaling), is added. Then, the XML file created by the conversion is transmitted to the filter execution unit 45.

In S204, the process controls the filter execution unit 45 to apply the filter process to the print job data. In this filter process, the process firstly refers to the filter setting file 431 to retrieve all the available functional filters into the memory. In the print job data converted into the XML file in S203, the print area adjustment has been selected. Therefore, the functional filter 52 must be retrieved.

In accordance with the settings defined in the print job data, the process executes the filter processes of "scaling," "layout," "mirror" and "watermark" to create the image the user desires, and further executes the print area adjustment process (S206) as the print area adjustment process is set (S205: YES). By the print area adjustment process, the magnification/reduction ratio to be applied to the image is adjusted so that the entire image is located within a predetermined area of the recording sheet. Then, thus processed print job data is developed to the bitmap data using the "RIP" filter and transmitted to the printer 2 as the print data of PDF format (S207). As above, the print job data is transmitted to the printer 2 such that the EMF file is automatically converted to the XML file, and further the print area is automatically adjusted.

If the print job data is from the XML application (S202: YES), the process modifies the filter setting file 431 using the filter configuration modifying unit 42 (S211). Specifically, the filter configuration modifying unit 42 analyzes the data regarding the settings of the printer driver 4 associated with the print job data and judges whether the scaling function is selected.

If the scaling function is not selected, it is unnecessary to retrieve the functional filter 52. Further, the print area adjustment process is only necessary when the EMF file is converted to the XML file. Therefore, the print area adjustment process is unnecessary if the printer driver 4 acquires the print job data as the XML file. If the print area adjustment process has been selected even if the received data is the XML file, it is likely that the user erroneously selected the function or there is some disorder in the application. Therefore, when the scaling function has not been selected or only the print area adjustment process has been selected, execution of the scaling function is inhibited.

When the scaling function is selected, the process judges whether the selection is only the print area adjustment process. If the selection is not only the print area adjustment, that is the scaling function is selected to magnify/reduce the image at a desired ratio, the process does not modify the filter setting file 431 and executes step S204. If only the print area adjustment process is selected or no scaling function is selected, the process modifies the filter setting file 431 so that the functional filter 52 is not retrieved.

Figures 6, 7:
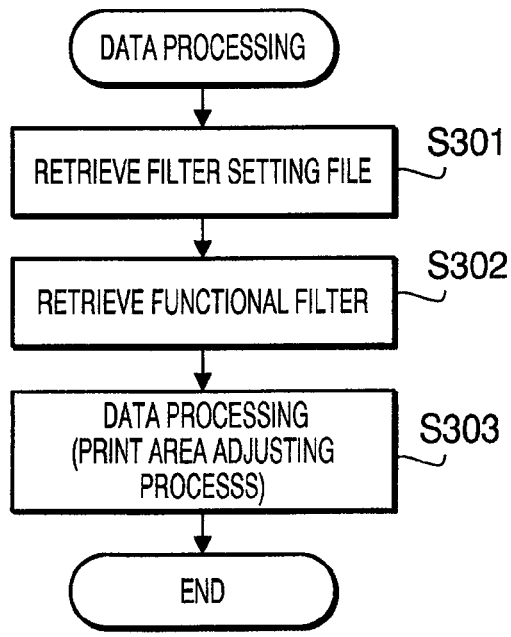
FIG. 6 shows an example of content of a filter setting file in which usage of scaling has been disabled.
FIG. 7 is a flowchart illustrating a filter process according to the first embodiment.

FIG. 6 shows the filter setting file 431 after the modification is made. As can be appreciated by comparing FIG. 6 with FIG. 3, the information regarding the functional filter 52 has been removed in the filter setting file 431 shown in FIG. 6. Therefore, the "scaling" function is not used. It should be noted that, in this embodiment, the information regarding the scaling function has been removed. This may be modified such that the information regarding the scaling function is merely commented out (i.e., disabled by changing the lines regarding the scaling function into comment lines).

In S204, the filter execution unit 45 executes the filter process of the print job data. FIG. 7 shows a flowchart illustrating the filter process executed in S204. As shown in FIG. 7, the process retrieves the filter setting file 431 in S301. Then, in S302, the process retrieves all the functional filters listed in the filter setting file 431 into the memory. It should be noted that, if the functional filter 52 has been removed or disabled in S211, the functional filter 52 is not retrieved.

Then, the process executes the filter process of "scaling," "layout," "mirror" and "watermark" to generate the image the user desires (S303). If the print job data subject to the filter process is the data generated by the EMF application 7e, the print area adjustment process is set in S203. In such a case, to the data converted into the XML file in S203, the print area adjustment process is applied during the filter process shown in FIG. 7.

After completion of the filter process shown in FIG. 7, the print job data is converted into the bitmap data by the "RIP" filter and transmitted to the printer 2 as the PDL format print data (FIG. 5: S205).

After completion of the filter process shown in FIG. 7, the printer driver 4 judges, in S206, whether the filter setting file 431 has been modified in S211. If the filter setting file 431 has been changed (S206: YES), the filter setting file control unit 43 sets the filter setting file 431 to its initial state (S207) referring to the backup 432. By initializing the filter setting file 431 after completion of the filter process (FIG. 7), affect of the previously executed printing job can be removed when the functions of the printer driver 4 is inquired by an application 7 or the next printing job is executed. After execution of S207, or the process judges that the filter setting file 431 has not been modified (S206: NO), the print process shown in FIG. 5 is finished.

As described above, the printer driver 4 is capable of judging the file type of the print job data, and automatically executing the print area adjustment process when necessary.

Therefore, the user is not required to judge the file type and adjust the print area. Thus, according to the printer driver 4 described above, deterioration of the printed image can be avoided without requiring the user to perform troublesome operations.

Further, according to the print driver 4 described above, the converter 41 sets the parameters of the XML file so that the functional filter 52 for scaling executes the adjustment process. Then, the filter execution unit 45 executes the adjustment process which is an optional process of the functional filter 52. Therefore, according to the above-described embodiment, the print area adjustment can be executed with a relatively simple configuration without changing the conventionally-employed filter process.

As described above, when the print job data is generated by the XML application 7x, the filter configuration modifying unit 42 prevents retrieval of the functional filter 52 to the memory. Therefore, even if the print area adjustment is erroneously set, execution of the same can be suppressed automatically, and thus deterioration of the printed image can be avoided. Further, since retrieval of the functional filter 52 into the memory is not executed, the process time can be shortened.

Second Embodiment

Figure 8:
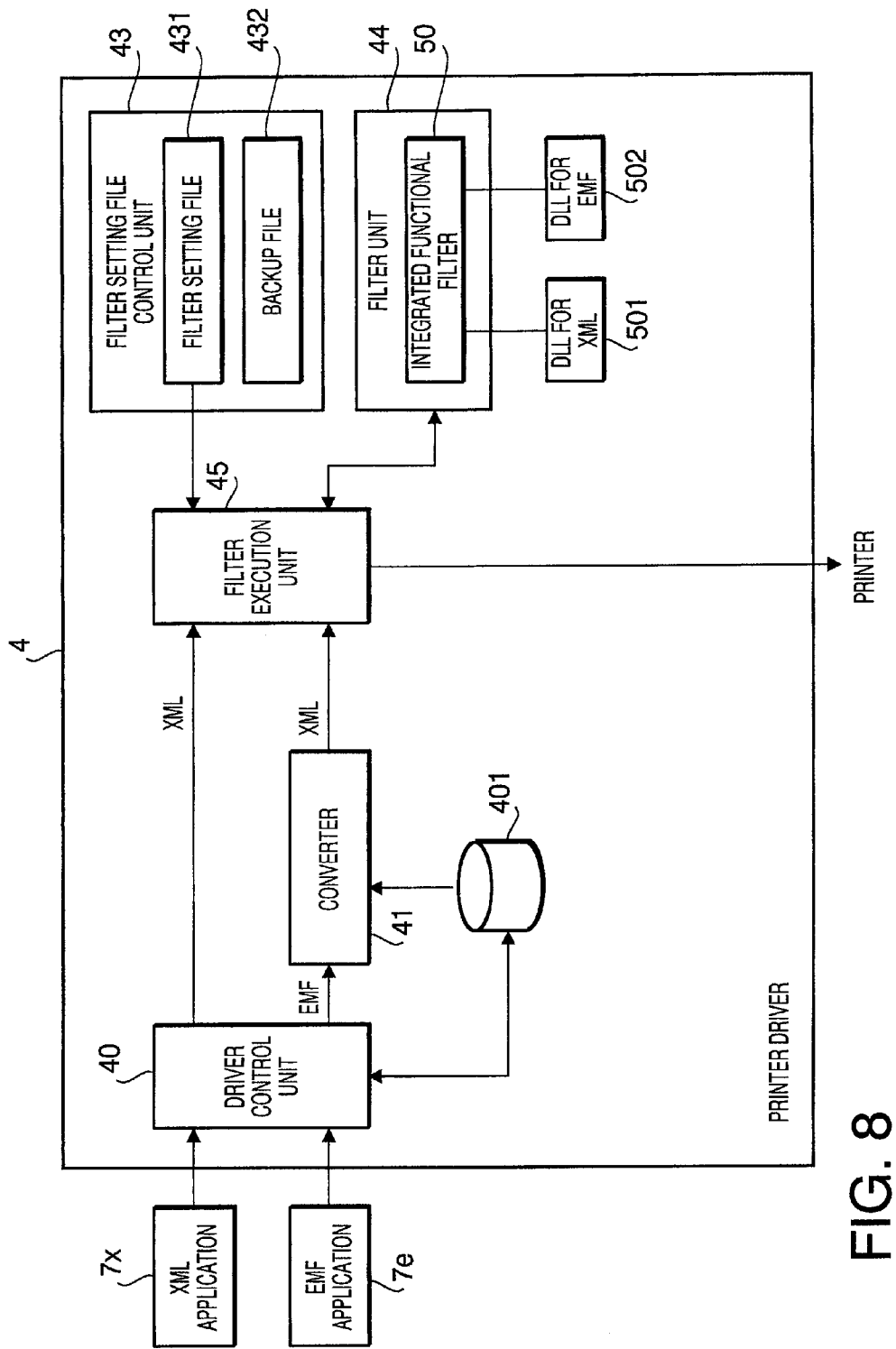
FIG. 8 is a block diagram showing a functional configuration of a printer driver according to a second embodiment of the invention.

FIG. 8 is a block diagram showing a printer driver 410 according to a second embodiment of the invention. The printer driver 410 includes, as shown in FIG. 8, a driver control unit 40, a converter 41, a filter setting file control unit 43, a filter unit 44 and a filter execution unit 45. The filter unit 44 includes an integrated function filter 50 which integrally executes filter process. It should be noted that the printer driver 410 according to the second embodiment is different from the first embodiment such that the second embodiment is provided with the integrated function filter 50 while the first embodiment is provided with the five functional filters 51-55 for respective functions.

The integrated filter 50 reads the information regarding the filter process recorded in the XML file and retrieves the functional filter as required. According to the second embodiment, the functional filters are provided as the DLLs, and retrieved depending on necessity. The DLLs may be provided corresponding to the functions, or corresponding to the types of the applications.

According to the second embodiment, the integrated functional filter 50 includes a first DLL 501 for the XML application and a second DLL 502 for the EML application, one of which is retrieved when necessary. The second DLL 502 has a function of the print area adjustment, which the first DLL 501 does not have the function of the print area adjustment.

Print Process of 2nd Embodiment

Figure 9:
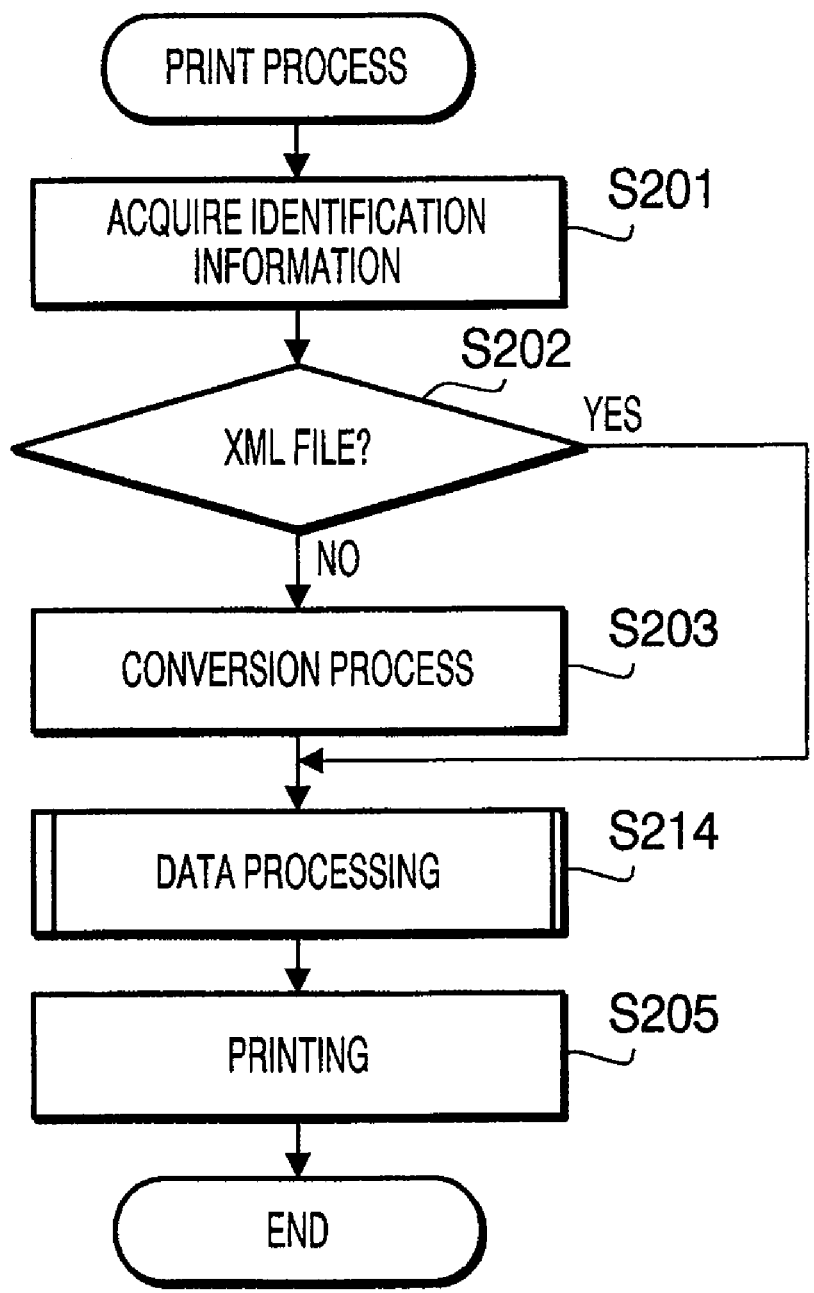
FIG. 9 is a flowchart illustrating a printing process according to the second embodiment.

FIG. 9 shows a flowchart illustrating the print process according to the second embodiment. The step numbers in FIG. 9 correspond to those in FIG. 5. In the print process according to the second embodiment, only one functional filter is retrieved at a time. As shown in FIG. 9, according to the second embodiment, the filter setting file 431 is not modified (i.e., S203 of FIG. 5 is not included in FIG. 9). Further, since the filter setting file 431 is not modified, steps S206, S207 and S211 of FIG. 5 are not included in the print process shown in FIG. 9.

Figure 10:
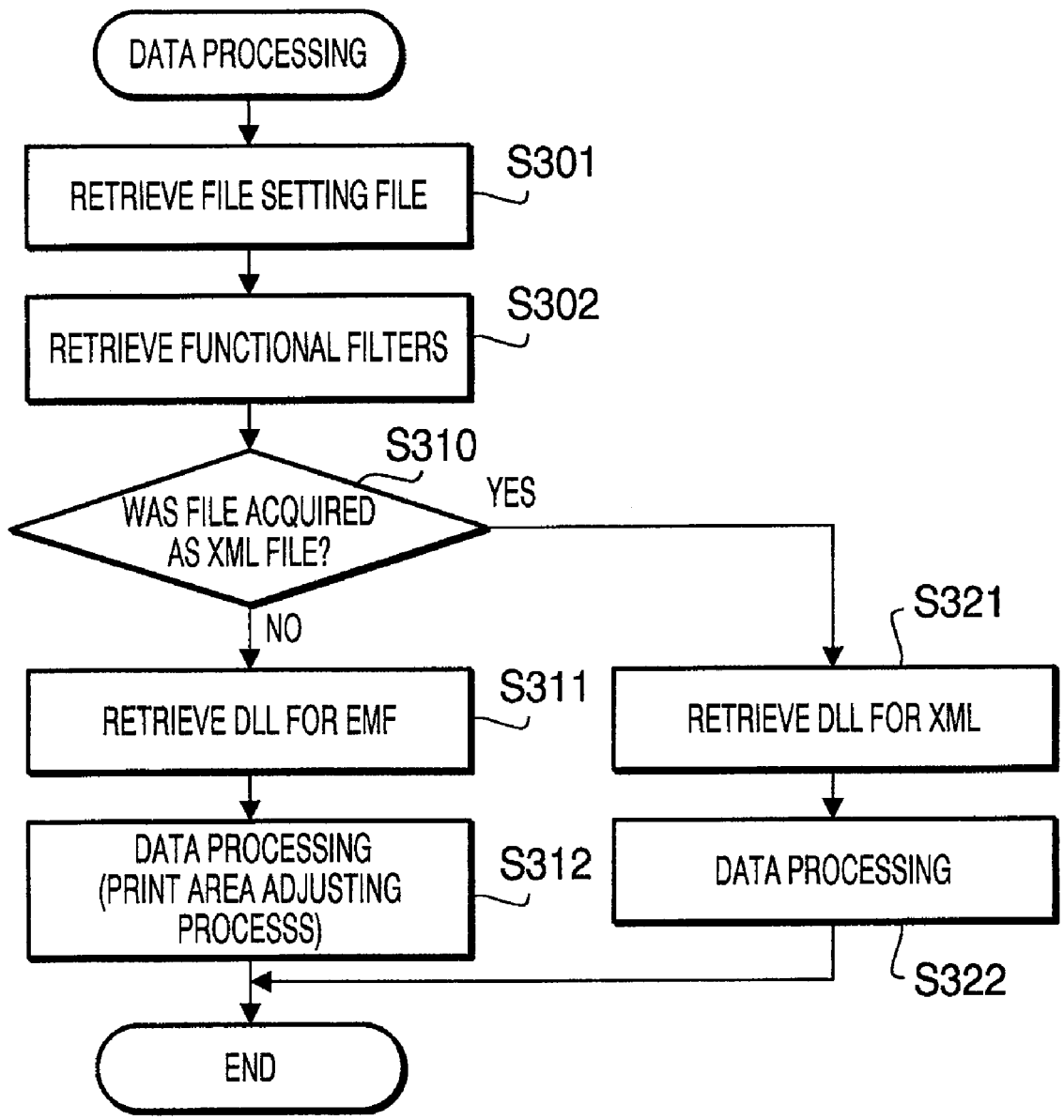
FIG. 10 is a flowchart illustrating a modifying process according to the second embodiment.

FIG. 10 shows a flowchart illustrating the filter process according to the second embodiment. The step numbers in FIG. 10 correspond to those in FIG. 4. In S302 of FIG. 10, the process retrieves the integrated functional filter 50. Then, in S310, the process judges whether the XML file to be processed is originally created by the XML application 7x or originally created by the EMF application 7e and converted to the XML file in S203 of FIG. 9. The type of the file (i.e., the originally acquired file) is judged referring to the judgment result file 401 similarly to the first embodiment.

If the XML file is one converted from the EMF file (S310: NO), the process retrieves the second DLL 502 for the EMF file (S311). Then, the process applies the filter process set in the print job file (S312). It should be noted that the print area adjustment process has been set in the print job file in S203 of FIG. 9. Therefore, when step S312 is executed, the print area adjustment is also executed.

If the XML file is one originally acquired from the XML application 7x (S310: YES), the process retrieves the first DLL 501 for the XML file (S321). Then, the process applies the filter process set in the print job file (S322). At this stage, if the user has erroneously select the print area adjustment, since the first DLL 501 does not support the function, the print area adjustment is not executed.

As described above, according to the printer driver 410, similarly to the first embodiment, the file type of the print job data is analyzed, and the print area adjustment is automatically executed when necessary. Therefore, the use is not required to manually set the print area adjustment.

According to the second embodiment, a plurality of DLLs are provided for the applications, respectively, and only a necessary function is utilized. With this configuration, even if the print area adjustment is erroneously set in the XML file, execution thereof can be avoided automatically. Accordingly, deterioration of the printed image can be suppressed. Further, since the filter setting file 431 is not modified, reliability of the filter process is improved in comparison with the first embodiment.

Third Embodiment

Configuration of Printer Driver

Figure 11:
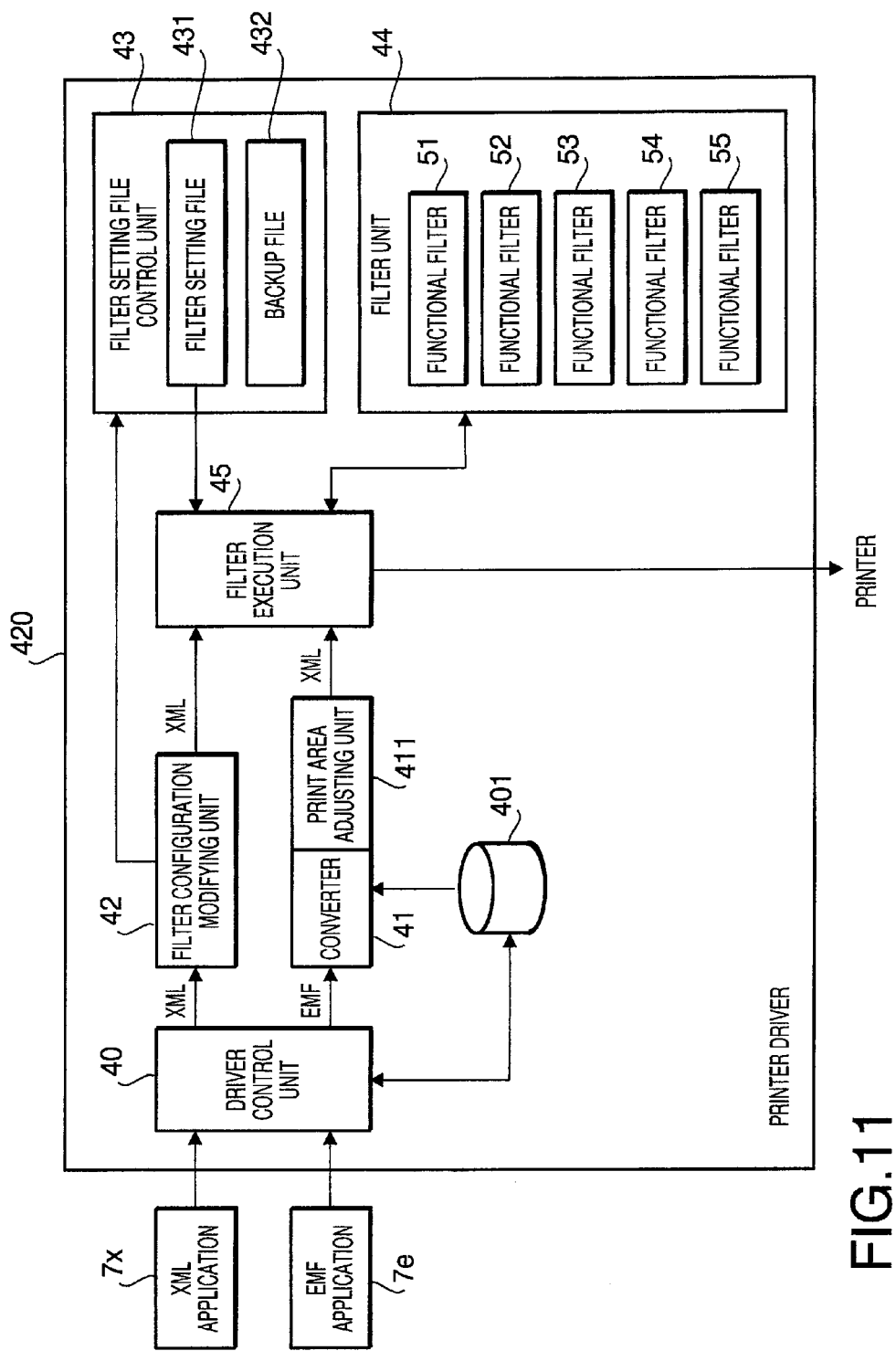
FIG. 11 is a block diagram showing a functional configuration of a printer driver according to a third embodiment of the invention.

FIG. 11 is a block diagram showing a configuration of a printer driver 420 according to a third embodiment. As shown in FIG. 11, the printer driver 420 includes a driver control unit 40, a converter 41, a filter configuration modifying unit 42, a filter setting file control unit 43, a filter unit 44 and a filter execution unit 45. Further, as a part of the converter 41, the printer driver 420 includes a print area adjusting unit 411 configured to execute the print area adjustment process.

As mentioned above, the print area adjusting unit 411 is provided as one function of the converter 41. That is, according to the first embodiment, the print area adjustment is executed as a function of the functional filter 52 which is a functional filter for scaling. In contrast, according to the third embodiment, the print area adjusting function is realized by the converter 41, and the functional filter 52 need not include the print area adjusting function.

Print Process of 3rd Embodiment

Figure 12:
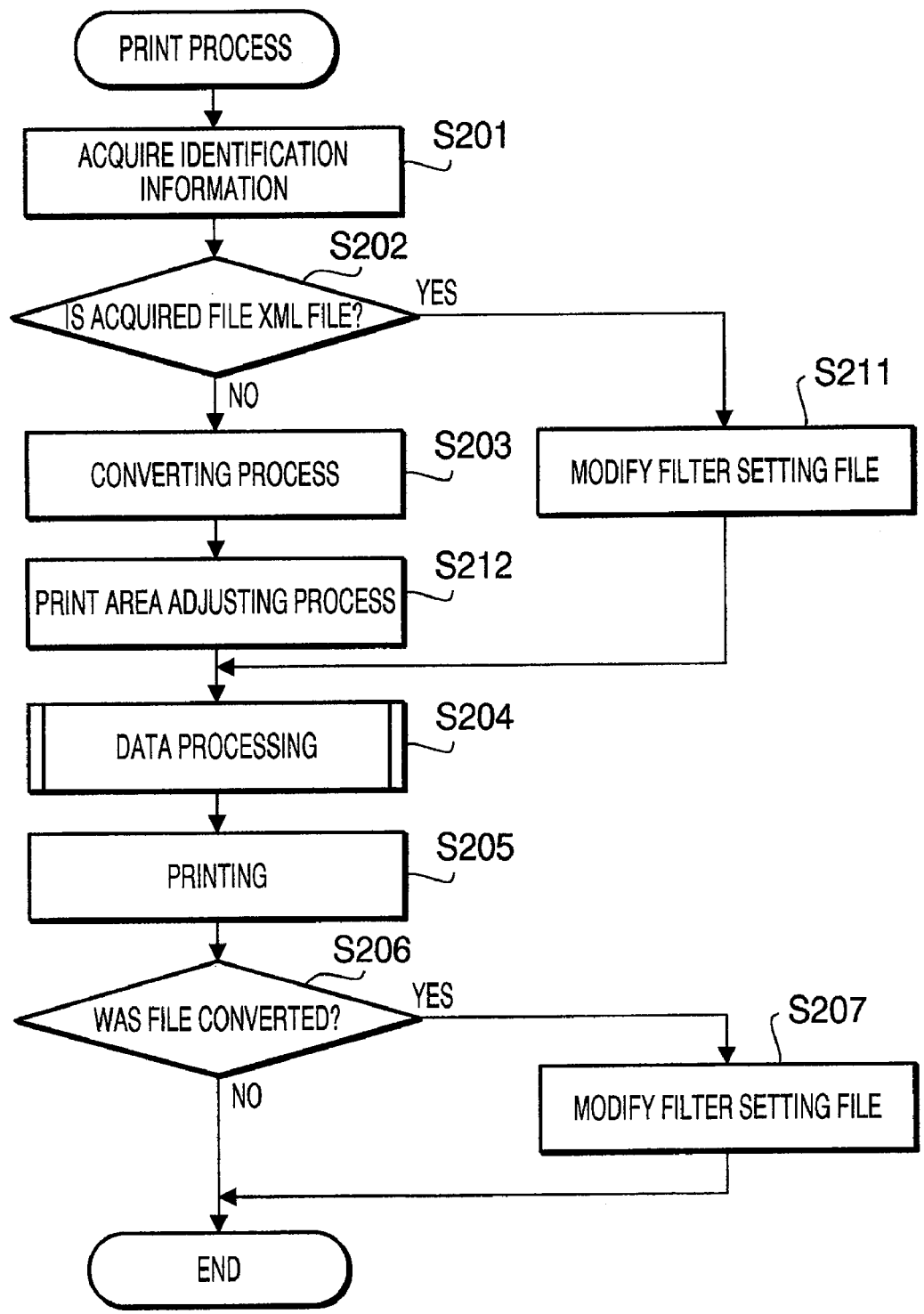
FIG. 12 is a flowchart illustrating a printing process according to the third embodiment.
Figure 13:
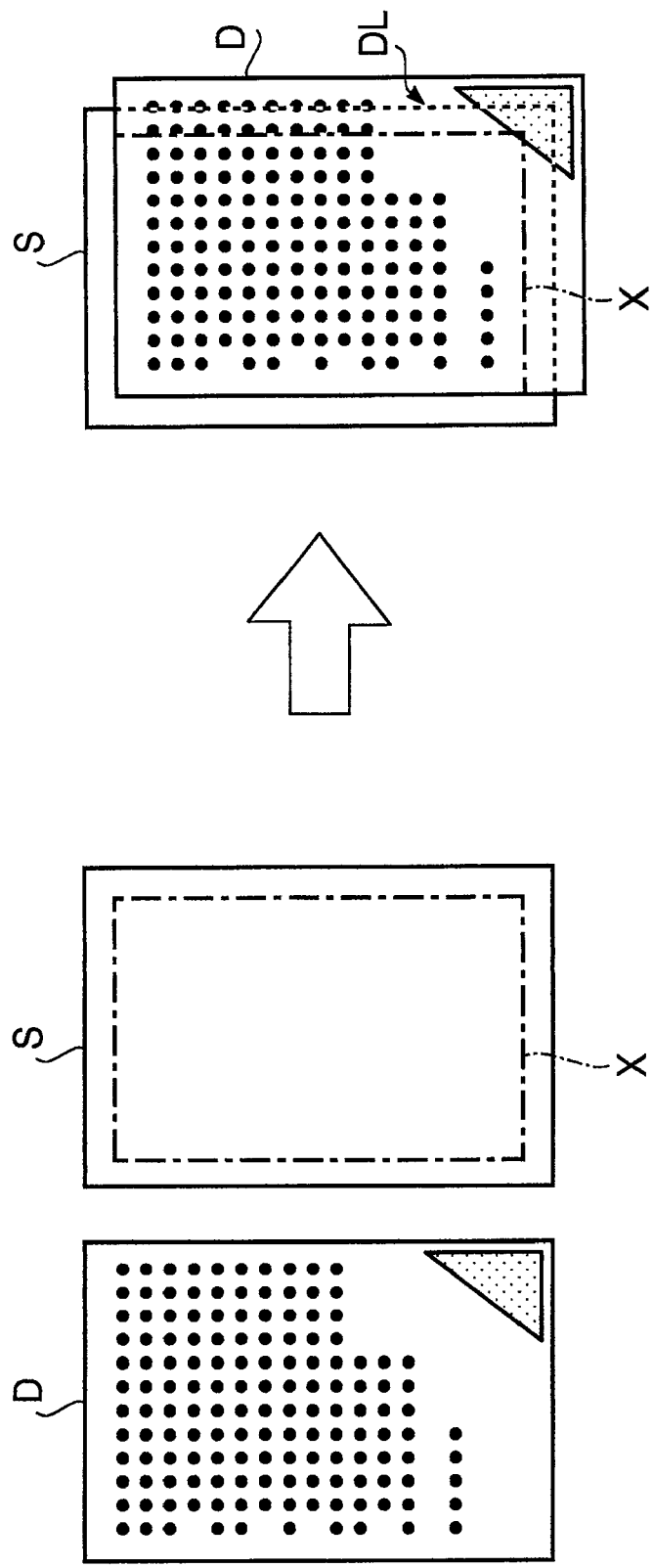
FIG. 13 illustrates a difference of print areas due to a difference of file types according to a conventional printer driver.

FIG. 12 shows a flowchart illustrating a print process according to the third embodiment. The step numbers in FIG. 12 correspond to those in FIG. 5. As shown in FIG. 12, after the converter 41 converts the EMF file to the XML file (S203), the print area adjusting unit 411 executes the print area adjusting process in S212 before the filter process is executed in S204. Since the print area adjustment is executed in S212, the filter process in S204 does not include the print area adjusting process.

It should be noted that a setting of the print area adjustment process, which is an optional process of the scaling filter, is added to the print job in S203 of the first embodiment (FIG. 5). In contrast, according to the third embodiment, such a setting is not added. That is, a flag for identifying the file type is not necessary since the print area adjustment is executed immediately after the conversion from the EMF file to the XML file is executed.

According to the third embodiment, similar to the first embodiment, the file type of the print job is automatically judged, and the print area adjusting process is automatically executed when necessary. Therefore, the user is not required to manually make a setting of the print area adjustment.

As described above, the printer driver 4, 410 or 420 is capable of processing both of the EMF file and the XML file. The print job data having the EMF file format is converted into the print job data of the XML file format by the converter 41, and treated as the XML file and the filter process is applied by the filter execution unit 45.

According to the embodiments, it is judged whether the print job data is of the EMF file or XML file automatically. Then, when the print job data is of the EMF file, it is automatically converted into the XML file. Further, when the EMF file is converted into the XML file, the print area adjusting process is automatically applied so that displacement of the print area caused by the conversion from the EMF file to the XML file is corrected. Therefore, the print driver according to the embodiments does not require the user to perform troublesome adjustment process, and deterioration of the printed image can be suppressed automatically.

It should be appreciated that the embodiments described above are only exemplary embodiments and the invention needs not be limited to the configurations of described above. Rather, various modifications and/or improvements can be made without departing the scope of the invention. For example, the device to which the invention is applied need not be limited to a printer, but can be applied to a copier, a facsimile machine and/or a multi-function peripheral having an image forming function. Further, although the PC is described as an example of an information terminal device which transmits the print jobs, any other suitable devices such as a work station and/or a portable information terminal devices may be employed instead of or in addition to the PC. Furthermore, the print system need not be limited to one having the image forming device and information terminal device separately, but the print system may be one in which the image forming device and the information terminal device are integrally provided.

In the first embodiment, the functional filter for scaling has the print area adjustment function, and executed the print area adjustment process as an option of the scaling function. The invention need not be limited to such a configuration and a functional filter only for the print area adjustment may be employed. In such a case, the filter setting file may be rewritten to disable retrieval of such a filter (for print area adjustment) when the print job generated by the XML application is executed.

What is claimed is:

1. A print control device capable of processing print job data having a first file format and print job data having a second file format which is different from the first file format, comprising:
    a judging unit configured to judge whether the print job data has the first file format or second file format;
    a converting unit configured to convert the print data having the first file format to the print job data having the second file format;
    an adjusting unit configured to apply a print area adjustment to the print job data converted by the converting unit only when the judging unit judges that the print job data has the first file format; and
    a data processing unit configured to apply a data processing to the print job data having the second file format.

2. The print control device according to claim 1,
wherein the data converting unit adds a parameter instructing the adjusting unit to adjust the print area, and
wherein the print area adjustment by the adjusting unit is executed by the data processing unit.

3. The print control device according to claim 2,
wherein the data processing unit includes:
    at least one functional filter configured to apply a data processing to the print job data having the second file format;
    a filter configuration storage storing configuration information regarding functional filters; and
    a filter executing unit configured to execute the data processing of the print job data based on the configuration information regarding the functional filters, and
wherein the adjusting unit is configured as a print area adjusting filter which is a functional filter executing the print area adjustment.

4. The print control device according to claim 3,
further including a restricting unit configured to rewrite, when the judging unit judges that the print job data has the second file format, the configuration information of the functional filters stored in the filter configuration storage so that execution of the print area adjusting filter is disabled.

5. The print control device according to claim 2,
wherein the data processing unit includes:
    an integrated functional filter configured to apply data processing to the print job data having the second file format; and
    a filter execution unit configured to retrieve the integrated functional filter based on configuration information of the functional filters stored in the filter configuration storage and apply the data processing to the print job data, and
wherein the adjusting unit is configured as the print area adjusting process which is one function provided by the integrated functional filter.

6. The print control device according to claim 5,
further including at least two processing units for applying data processing to the print job data,
wherein a different part of the integrated functional filter is retrieved depending on the judging result of the judging unit.

7. The print control device according to claim 1,
wherein the data processing unit includes:
    at least one functional filter configured to apply data processing to the print job data having the second file format;
    a filter configuration storage storing a configuration of the functional filter; and
    a filter execution unit configured to apply the data processing to the print job data, and
wherein the adjusting unit transmits the print job data, to which the adjustment has been applied, to the filter execution unit.

8. A computer accessible recording medium storing a printer driver which contains computer-readable instructions, the printer driver being capable of processing print job data having a first file format and print job data having a second file format which is different from the first file format, the printer driver comprising:
- a judging unit configured to judge whether the print job data has the first file format or the second file format;
- a converting unit configured to convert the print job data having the first file format to the print job data having the second file format if the judging unit judges that the print job data has the first file format;
- an adjusting unit configured to apply a print area adjustment to the print job data converted by the converting unit only when the judging unit judges that the print job data has the first file format; and
- a data processing unit configured to apply a data processing to the print job data having the second file format.

9. The recording medium according to claim 8,
wherein the data converting unit adds a parameter instructing the adjusting unit to adjust the print area, and
wherein the print area adjustment by the adjusting unit is executed by the data processing unit.

10. The recording medium according to claim 9,
wherein the printer driver includes:
- at least one functional filter configured to apply a data processing to the print job data having the second file format;
- a filter configuration storage storing configuration information regarding functional filters; and
- a filter executing unit configured to execute the data processing of the print job data based on the configuration information regarding the functional filters, and wherein the adjusting unit is configured as a print area adjusting filter which is a functional filter executing the print area adjustment.

11. The recording medium according to claim 10,
wherein the printer driver further includes a restricting unit configured to rewrite, when the judging unit judges that the print job data has the second file format, the configuration information of the function filters stored in the filter configuration storage so that execution of the print area adjusting filter is disabled.

12. The recording medium according to claim 9,
wherein the data processing unit includes:
- an integrated functional filter configured to apply data processing to the print job data having the second file format; and
- a filter execution unit configured to retrieve the integrated functional filter based on configuration information of the functional filters stored in the filter configuration storage and apply the data processing to the print job data, and wherein the adjusting unit is configured as the print area adjusting process which is one function provided by the integrated functional filter.

13. The recording medium according to claim 12,
wherein the printer driver further includes at least two processing units for applying data processing to the print job data,
wherein different parts of the integrated functional filter is retrieved depending on the judging result of the judging unit.

14. The recording medium according to claim 8,
wherein the data processing unit includes:
- at least one functional filter configured to apply data processing to the print job data having the second file format;
- a filter configuration storage storing a configuration of the functional filter; and
- a filter execution unit configured to apply the data processing to the print job data, and wherein the adjusting unit transmits the print job data, to which the adjustment has been applied, to the filter execution unit.

15. A print control device capable of processing print job data having a first file format and print job data having a second file format which is different from the first file format, comprising:
- a processor; and
- memory storing computer readable instructions that, when executed, cause the print control device to:
  - judge whether the print job data has the first file format or second file format;
  - convert the print job data having the first file format to the print job data having the second file format;
  - apply a print area adjustment to the converted print job data only when the print job data has the first file format; and
  - apply data processing to the print job data having the second file format.

\* \* \* \* \*

UNITED STATES PATENT AND TRADEMARK OFFICE
CERTIFICATE OF CORRECTION

| | |
|---|---|
| PATENT NO. | : 8,027,057 B2 |
| APPLICATION NO. | : 12/184768 |
| DATED | : September 27, 2011 |
| INVENTOR(S) | : Tomoyuki Akashima |

It is certified that error appears in the above-identified patent and that said Letters Patent is hereby corrected as shown below:

Column 12, Claim 8, Line 65:
Please delete "A computer accessible recording medium" and insert --A computer accessible non-transitory recording medium--

Signed and Sealed this
Fourth Day of December, 2012

David J. Kappos
*Director of the United States Patent and Trademark Office*